July 22, 1969  D. F. WOOR ET AL  3,456,761
LUBRICATING APPARATUS FOR VEHICLES
Filed March 8, 1966  5 Sheets-Sheet 2

INVENTORS
DENIS FREDERICK WOOR
PETER WILLIAM STRIPP and
MAX EDWARD GRANTHAM
BY
Mason, Kolehmainen, Rathburn + Wyss
ATTORNEYS

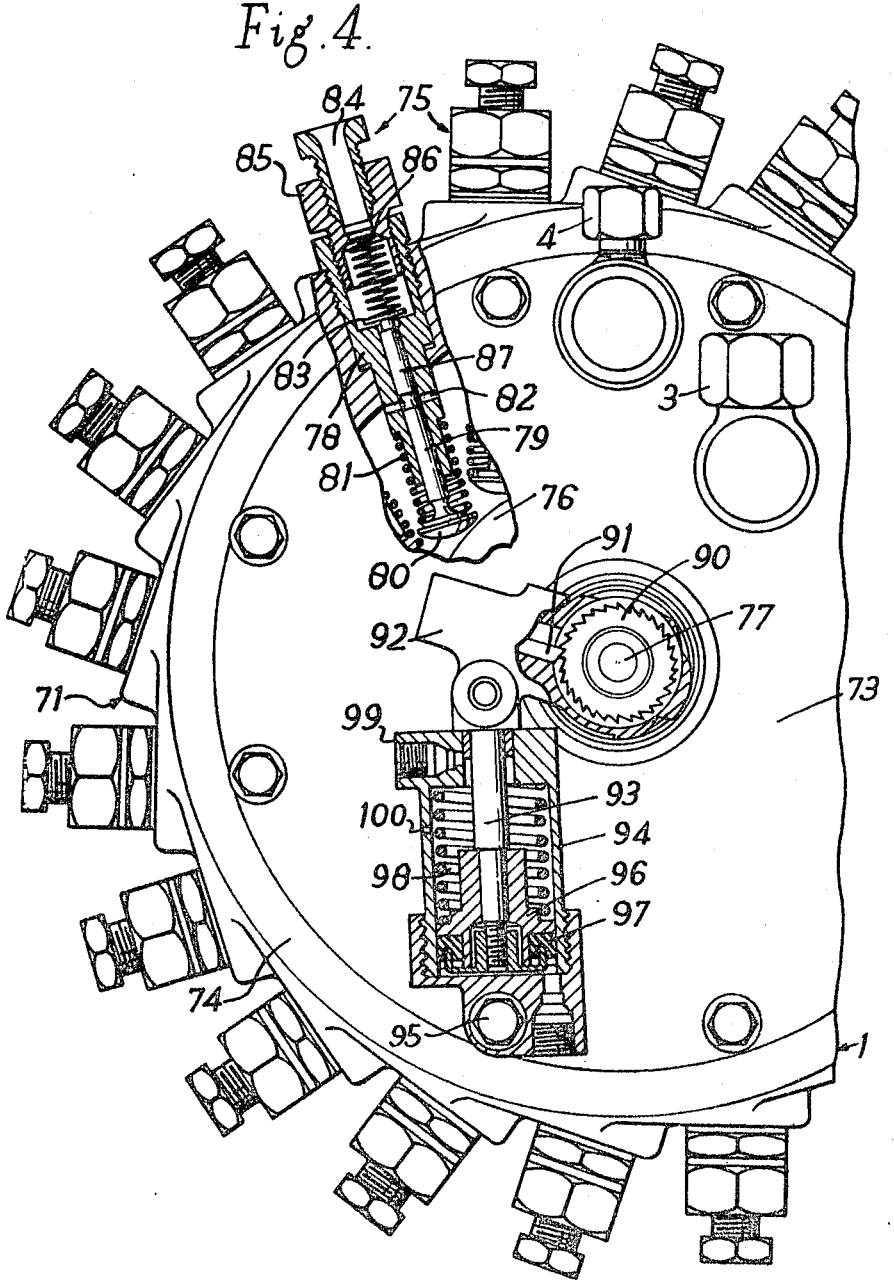

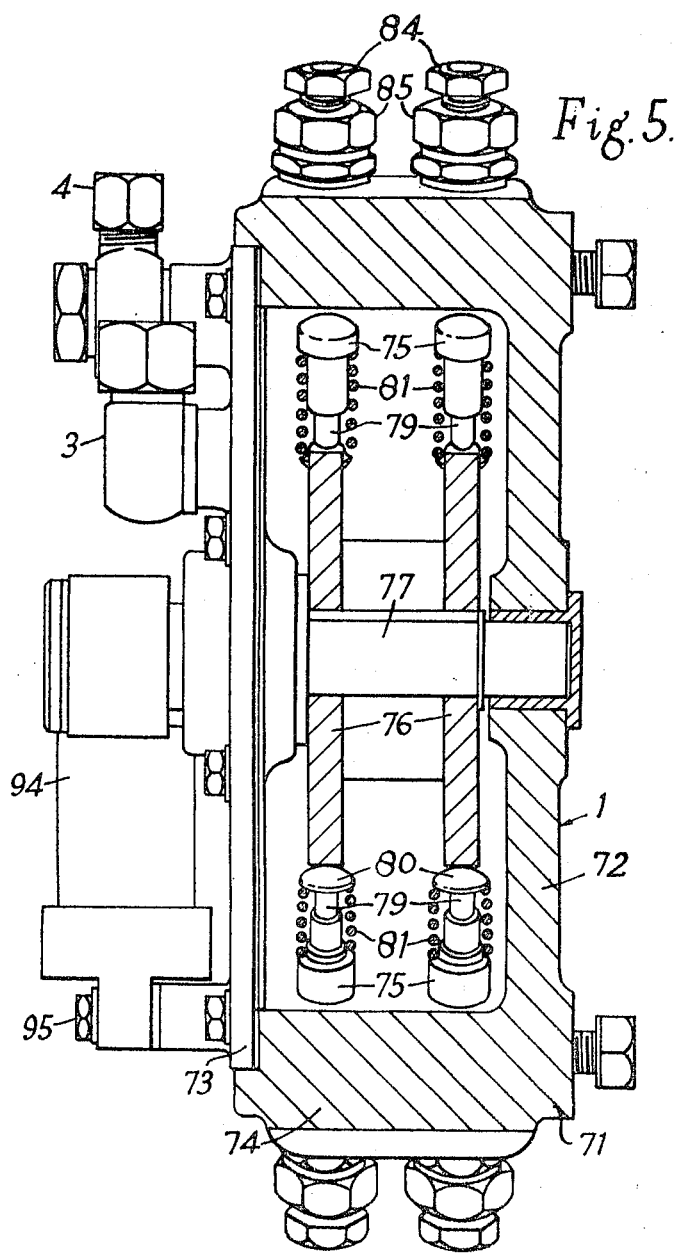

July 22, 1969   D. F. WOOR ET AL   3,456,761
LUBRICATING APPARATUS FOR VEHICLES
Filed March 8, 1966   5 Sheets-Sheet 5

INVENTORS
DENIS FREDERICK WOOR
PETER WILLIAM STRIPP and
MAX EDWARD GRANTHAM
BY
Mason, Kolehmainen, Rathburn & Wyss
ATTORNEYS United States Patent Office 3,456,761
Patented July 22, 1969

3,456,761
LUBRICATING APPARATUS FOR VEHICLES
Denis Frederick Woor and Peter William Stripp, Plymouth, and Max Edward Grantham, Plympton, England, assignors to Tecalemit (Engineering) Limited, Plymouth, England
Filed Mar. 8, 1966, Ser. No. 540,445
Claims priority, application Great Britain, Mar. 10, 1965, 10,155/65
Int. Cl. F16n 7/14, 13/22
U.S. Cl. 184—7                                    10 Claims

ABSTRACT OF THE DISCLOSURE

There is provided a lubricating system for a vehicle which includes a lubricating pump having separate pump means for each point of the vehicle to be lubricated. The lubricating pump is operated by pulses of air from an air system in the vehicle. The pulses of air are transmitted by means of a control unit which is connected to the tachometer or other transmission reference so as to provide the necessary impulses in proportion to the distance that the vehicle has been driven.

---

This invention relates to lubricating apparatus and systems and it is especially concerned with the lubrication of vehicles. It is a more particular object of the invention to provide an improved centralised chassis lubrication system for vehicles, although the invention could also be applied to lubrication systems for other purposes.

It is an important object of the present invention to provide a lubrication system and apparatus which are designed to supply lubricant to a number of points on a vehicle or other machine at times when the vehicle or machine is working and in amounts which are controlled by the amount of such work. In the case of vehicles the invention provides means for ensuring that the lubrication of the various points to which the apparatus is connected can be made proportional to the distance travelled by the vehicle.

It is a useful feature of the invention that it provides a lubrication system and apparatus which can easily be included in or added to an existing design of vehicle, which can be done with little interference with the rest of the vehicle even though existing parts of the vehicle, particularly its speedometer drive and, where appropriate, its air brake system, are used to operate the lubricating apparatus.

According to the invention lubricating apparatus is provided for a vehicle or machine, which apparatus includes a lubricator for supplying lubricant to a number of points on the vehicle or machine and a control unit for controlling the operation of the lubricator, which control unit is adapted to be connected to the transmission system of the vehicle or to the machine so as to be operated in accordance with the distance travelled by the vehicle or the extent of the operation of the machine, wherein the lubricator is connected with the control unit by an air line and is adapted to be operated in response to periodic changes in air pressure produced by the control unit.

It is preferred, and this forms an important feature of the invention, that the control unit is arranged to be connected to an air brake system provided on the vehicle, or to some other source of air under pressure, and is designed so that it transmits pulses of air pressure to the pump or pumps so as to operate or at least control the operation of the latter.

The invention also provides a number of useful ways by which the control unit can be connected with the drive of the vehicle or other machine so that its operation will be proportional to the distance travelled by the vehicle or the amount of operation of the machine. Thus the control unit can be connected in or to the speedometer drive of a vehicle, whether this is of a cable or of some other type, such as one using a tacho-generator or an electrical impulse unit driven from the gearbox of the vehicle.

The invention is also concerned with further features of the lubrication system and apparatus, including the provision of means for ensuring that it will only operate when a proper supply of air is available and the provision of operating mechanism for the lubricating pump or pumps whereby the pressure air is used actually to operate the latter.

Further features of the invention will become apparent from the following description of certain preferred embodiments thereof. Chassis lubrication systems for motor vehicles and parts of such systems will be described.

Reference will be made to the accompanying drawings, in which:

FIGURE 4 is a partly broken-away and sectional view of a lubricator which forms part of the system shown in FIGURE 1;

FIGURE 5 is a sectional view of the lubricator shown in FIGURE 4;

Figure 1:
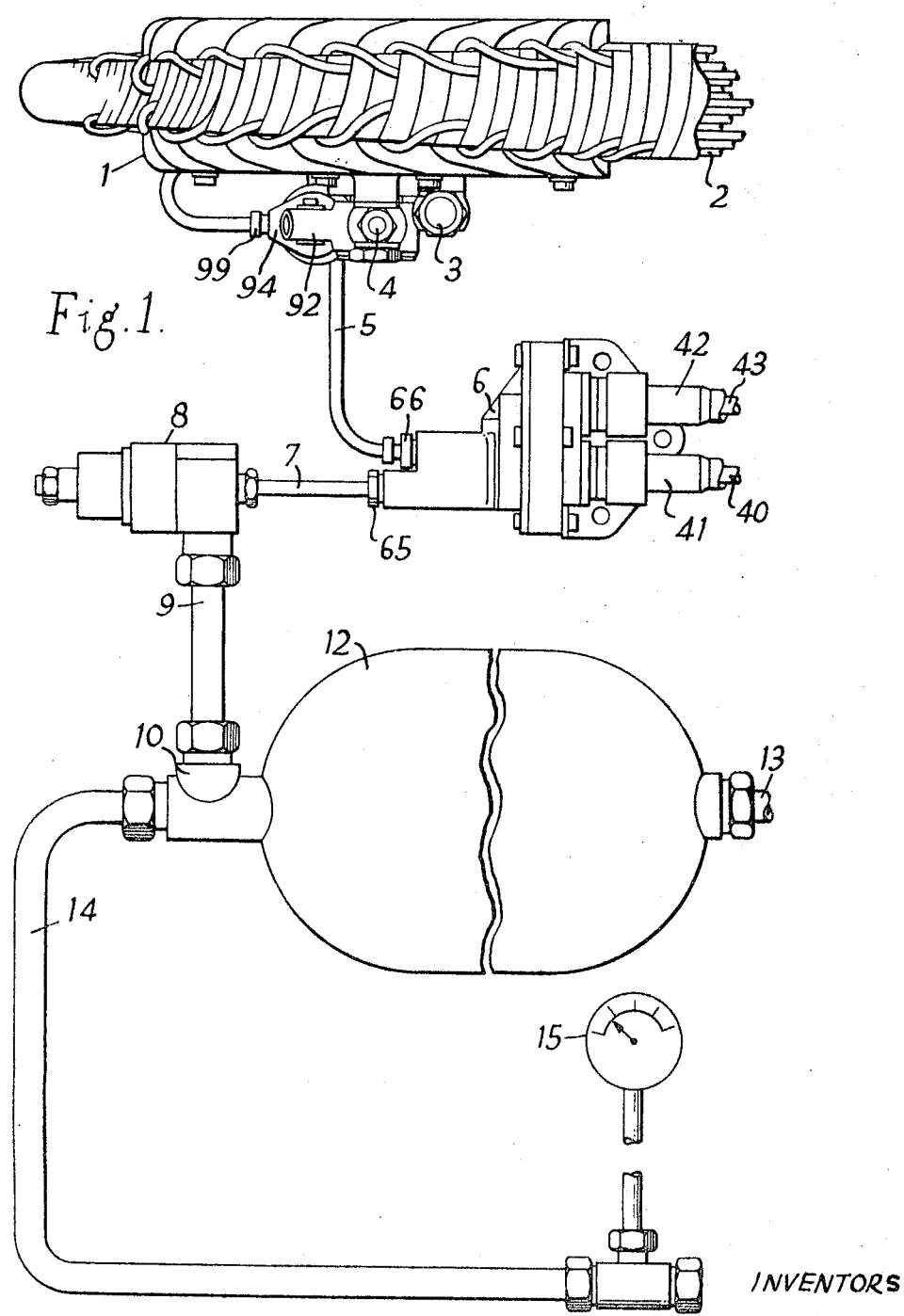
FIGURE 1 is a general view showing the principal parts of a vehicle lubrication system exemplifying the invention.

Referring first to FIGURE 1, the lubrication system shown comprises a central chassis lubricator unit 1, which is mounted in any convenient position on the vehicle and which is connected by oil supply lines, indicated generally at 2, to the individual points to be lubricated. It is also connected to an oil reservoir tank (not shown) from which it draws lubricating oil, which it then delivers under pressure to the various lubrication points. The connections to the oil tank include an oil supply line which leads from the bottom of the tank to an oil inlet 3 provided on the unit 1 and a line which leads from a vent 4 on the unit 1 back to the top of the oil tank.

The lubricator unit 1 is connected by an air line 5 with an air control unit 6, which latter is connected in the speedometer drive of the vehicle, as will be described. This air control unit 6 is itself supplied with air under pressure, for which purpose it is connected to the air pressure system which is used for operating the brakes of the vehicle. This connection is made through a pipe line 7 and an air safety valve 8, which latter is connected by a pipe 9 to a tapping 10 provided at a suitable point in the compressed air system, for example at a connection 11 on the compressed air cylinder 12. This cylinder 12 is supplied in the usual way through a pipe 13 with air from the vehicle air compressor, (not shown) whilst it is also connected to the vehicle brake system through a pipe 14. If desired it may also be connected to a pressure gauge 15 provided in the vehicle cab.

The object of the air safety valve 8 is to ensure that the lubrication system is only supplied with air to operate it when the air pressure in the air cylinder 12 exceeds a minimum value, which can be pre-set.

Figure 2:
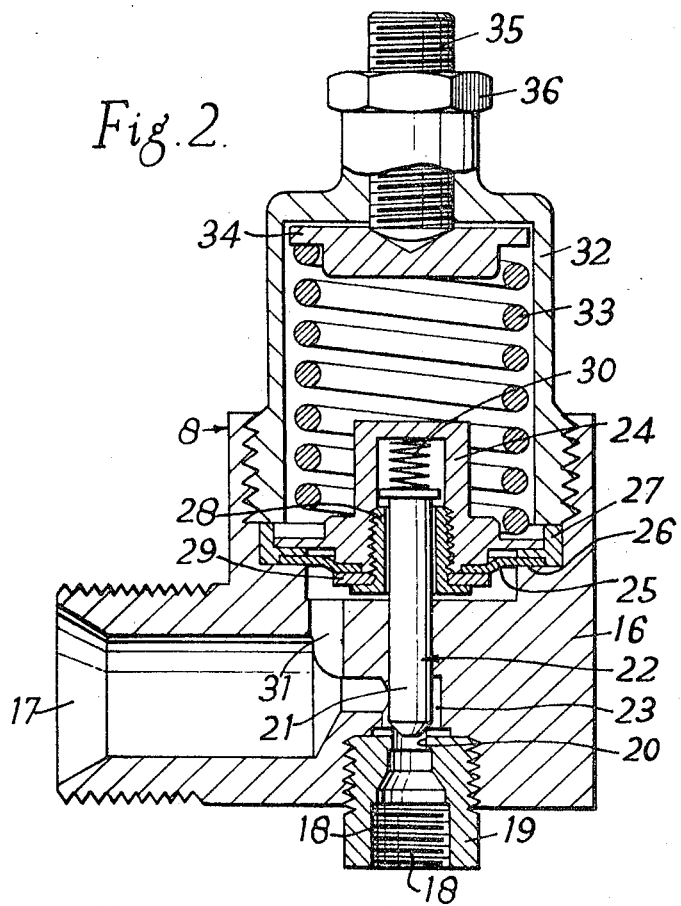
FIGURE 2 is an enlarged sectional view showing an air safety valve which forms part of the system shown in FIGURE 1.

Any suitable form of pressure responsive valve may be used for the air safety valve 8, but a preferred form of such a valve will be described with particular reference to FIGURE 2. This valve comprises a body 16 which is adapted to be bolted or otherwise secured to the vehicle at any convenient point on the latter. This body 16 is provided at its side with an air inlet 17 which is adapted to be connected to the air cylinder 12 through the pipe 9, whilst at its lower end (as seen in FIGURE 2) it has an outlet 18 which is connected to the air control unit 6.

This outlet connection 18 is in the base of a plug 19 the inner end of which forms a valve seat 20 which is engaged by the end of the stem 21 of a poppet valve 22 which is slidably mounted in the valve body 16. Air from the air cylinder 12 is supplied through the air inlet 17 to a space 23 surrounding the lower end of the poppet valve stem 21 above the seat 20, but it is prevented from being discharged past the latter to the outlet 18 when the valve is closed.

The upper end of the valve stem 21 engages in an opening formed in the underneath side of a carrier 24 which is mounted for limited up and down movement in a recess formed in the upper part of the valve body 16. Interposed between this carrier 24 and the wall of the recess is an annular diaphragm 25 made of a flexible, oil-resistant material, such as a synthetic rubber. The outer rim of this diaphragm is clamped between a step 26 formed near the bottom of the said recess and a ring 27 which is fitted into the latter, whilst its inner edge is clamped to the carrier 24 by means of a plug 28 screwed into the latter with the interposition of a washer 29.

The stem 21 of the valve 22 passes slidably through this plug 28 and its upper end is acted upon by an override spring 30 fitted in the carrier 24. The space below the diaphragm 25 is connected by a passage 31 to the air inlet 17 and to the space 23 around the stem 21 of the poppet valve 22 above the valve seat 20.

Screwed into the aforesaid recess in the valve body 16 above the carrier 24 is a generally cylindrical cover 32 containing a compression spring 33. The lower end of this spring 33 acts on the carrier 24 and tends to hold the valve closed.

The upper end of the spring 33 engages a disc 34 which is movable in the cover 32 and which can be forced downwardly in the latter by means of an adjusting screw 35 to adjust the compression of the spring 33. This adjustment controls the value of the air pressure which, acting on the diaphragm 25, is needed to force up the carrier 24 to open the safety valve. The screw 35 is provided with a lock nut 36.

The object of the over-ride spring 30 is to prevent bouncing of the safety valve.

Figure 3:
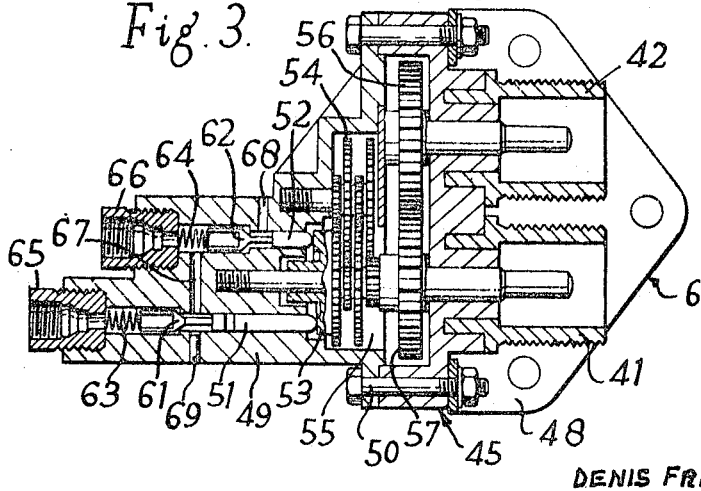
FIGURE 3 is a sectional view showing a control unit which forms an important part of the invention.

Turning now to the air control unit 6, which forms a useful feature of the invention, this unit, which is best shown in FIGURE 3, is designed to be mounted in any convenient position in the vehicle, which will generally be close to the line of the normal speedometer drive from the vehicle gear-box. Its object is to convert the movement of the vehicle, as conveyed by the speedometer drive, into timed air pulses which are used to operate the lubricator unit 1.

To fit the air control unit 6 the existing drive from the gear box of the vehicle to the speedometer is broken, which may be done by disconnecting the end of the speedometer drive cable 40 from the gear box and by connecting it instead to a similar drive connection 41 provided on the air control unit 6. This unit 6 also includes a second drive connection 42, which latter is now connected to the gear box by means of an additional short length of drive cable 43. In this way the air control unit 6 can be connected into the existing speedometer drive of the vehicle with very little disturbance of the latter, the drive from the gear box to the speedometer now being taken through the air control unit.

The invention also provides other methods of obtaining a drive for the air control unit which will be described later.

The air control unit 6 itself comprises a body 45, which could be formed of metal but which it is preferred should be formed of a suitable synthetic plastics material. This latter may be injection moulded with the inclusion of metal inserts where these are required for such things as bearings and the couplings for the drives from the gear box and to the speedometer.

The body 45 is preferably formed in two parts 48 and 49 which are secured together by means of a number of bolts 50. The body part 49 is formed with a pair of parallel bores in which a pair of inlet and exhaust tappets 51 and 52, respectively, are slidably mounted so that their ends are engaged by a spindle cam 53. This cam 53 is driven through a chain of reduction gearing, indicated generally at 54, which is arranged in a chamber 55 provided between the two body parts 48 and 49 and which includes a pair of gears 56 and 57 of equal size, one of which drives the other. The gear 56 is connected with and is driven from the coupling 42 to which the drive from the gear box is conveyed to the air control unit 6, whilst the other gear 57 is connected to and drives the coupling 41 to which the speedometer is connected. In this way, when the air control unit is fitted to the vehicle, it conveys the drive to the speedometer without any speed change in this drive. At the same time the cam 53, which controls the operation of the lubrication system, is driven at a very much reduced speed, which speed is, however, proportional to the road speed of the vehicle. The amount of speed reduction can be determined by the selection of the gears used in the air control unit.

Like the body of the air control unit, the gears used in it and also the cam 53 and tappets 51 and 52, as well as the poppet valves now to be described and other parts, could be made of metal or of suitable synthetic plastics materials. Suitable materials include nylon, nylon 11 being preferred, particularly for working parts. Other possible materials include polypropylene and acrylonitrile butadiene styrenes.

The bores in which the tappets 51 and 52 operate contain poppet valves 61 and 62 which are held pressed against the tappets by means of compression springs 63 and 64. The other ends of these springs are engaged by inlet and exhaust couplings 65 and 66 respectively which are screwed into the body part 49 and are connected respectively to the air safety valve 8 and to the lubricator unit 1. An air passage 67 is provided between the inlet and exhaust valves, whilst the exhaust valve is connected with atmosphere through an exhaust port 68. This exhaust port, coupled with suitable seals provided in this part of the unit, including a plug 69, ensures that the space between the two parts of the unit which contains the gears 54, 56 and 57 cannot become pressurized, so that further seals are not necessary here.

The inlet and exhaust valves 61 and 62 of the air control unit 6 are so designed and arranged to operate that a given number of revolutions of the speedometer drive cable causes a predetermined number of air pulses to be transmitted to the lubricator unit 1 to operate the latter. In this way any selected number of shots of lubricating oil per mile of travel of the vehicle can be fed to each of the points to be lubricated, as will be described.

Referring now to the chassis lubricator unit 1, which is best shown in FIGURES 4 and 5, this comprises a plurality of individual oil pumps which are connected to the different lubricating points, to which they deliver oil periodically at intervals which are determined by the design of the lubricator and by the frequency at which it receives pulses of air from the air control unit 6.

The individual pumps are preferably of the piston type and they may be arranged and operated in a number of ways. It is preferred, however, for them to be arranged circumferentially around one or more operating cams and in fact the pumping part of this lubricator unit may be similar to that which we supply under the name "Syndromic." In the present case, however, the reduction gearing and the belt drive which form parts of and which are used in the "Syndromic" system are replaced by a drive mechanism which is operated by the air pulses. This drive mechanism preferably takes the form of an air cylinder with its piston, together with a ratchet mechanism driven by the piston.

A preferred form of lubricator of this type, which is shown in the drawings, comprises a casing 71 of annular form which has a closed back 72 and the front of which is closed by means of a removable front plate 73.

The peripheral wall 74 of the casing 71 carries a plurality of individual oil pumps 75, which may be arranged in one, two or more rings, two being shown, and which are operated by one, two or more cams 76, as the case may be, which cams are keyed to and are driven by a central drive shaft 77.

Each of the pumps 75 comprises a cylinder 78, which passes through the wall 74 of the casing, and a main piston 79 having a mushroom head 80 which projects from the inner end of the cylinder 78 and engages its operating cam 76, against which cam the head is held by a compression spring 81 fitted between the head 80 and the cylinder 78.

The interior of the casing 71 is connected to the oil tank or reservoir (not shown) of the system through its inlet connection 3 and is kept filled with oil, which enters the cylinders of the pumps 75 through ports 82 formed in the sides of the latter. This oil is delivered by the action of each of the aforesaid main pistons 79 past a non-return delivery valve 83 to the outlet 84 of that pump, which outlet is located in a plug 85 which is screwed into the outer end of the cylinder 78, where the interior of the latter is enlarged as shown. Each of these outlets 84 is connected by suitable piping 2 (FIGURE 1) to one of the points to be lubricated.

Each of the non-return valves 83 is held closed against its seat by a compression spring 86 the outer end of which engages the plug 85. Included in each cylinder between the main piston 79 and the non-return valve 83 is a secondary piston 87 which provides control of the quantity of oil which is supplied by each pump to its lubrication point. This it does because the length of the secondary piston 87, which is a loose fit in the cylinder so that oil is forced past it during the pumping stroke, determines the volume of the space between the pistons into which oil is drawn during induction and thus determines the volume of oil which is pumped at each stroke.

Mounted on the end of the cam shaft 77 in front of the casing 71 is a ratchet wheel 90 (FIGURE 4) which is engaged and operated by a drive pawl 91. This pawl 91, which is spring-urged into engagement with the ratchet wheel 90, is mounted on a crank 92 which is arranged for limited angular movement about the axis of the ratchet wheel 90. This crank 92 is connected to the end of the piston rod 93 of a single acting air cylinder 94, which latter is pivotally mounted at 95 on the front plate 73 of the lubricator 1 below the centre thereof. A piston 96 provided with suitable sealing rings 97 is mounted on the inner end of the piston rod 93 and is biased downwardly by means of a compression spring 98 fitted in the cylinder 94.

The pulses of air from the air control unit 6 operate the piston 96 against the force of the spring 98 so that each pulse turns the ratchet wheel 90 and thus the operating cams 76 of the pumps 75 through a predetermined angle.

Oil from one of the lubricating pumps 75 is supplied to the air cylinder 94 through a suitable connection 99 so as to lubricate the piston rod 93, some of this oil then being allowed to run down into the interior of the cylinder 94. It here lubricates the piston 96 and also maintains an air seal for the latter, the level of oil which may collect in the cylinder being limited by a bleed hole 100 formed in the cylinder wall above the piston 96.

The assembly and operation of the lubrication system will be clear from the foregoing description.

The chassis lubricator 1 and air control unit 6, as well as the oil reservoir tank and the air safety valve 8, are mounted in any convenient positions in the vehicle, the air safety valve 8 being connected to the air supply of the vehicle brake system as shown in FIGURE 1. The air control unit 6 is interposed in the speedometer drive as has been described.

During travel of the vehicle along the road, air pulses are transmitted to the chassis lubrication 1 at a rate which is determined by the speed of the vehicle and by the overall ratio of the gearing which is included in the drive of the air control unit 6 and which is incorporated in this unit itself. As a result a selected number of air pulses are supplied to the lubricator 1 for a given distance travelled. These pulses operate the oil pumps 75 so that each lubricating point is supplied with oil at intervals which are themselves proportional to the distance travelled.

In the system which has been described separate cable drives are fused from the gear box of the vehicle to the control unit 6 and from this unit to the speedometer, but other arrangements are possible. For example, the control unit could be designed so that it can be mounted directly on the gear box at the speedometer drive take-off point, so that it would be driven directly from the gear box. In this case there would be only one cable drive, that is from the control unit 6 to the speedometer. By a suitable modification of the design of the unit 6, a straight-through drive would be possible. Thus a gear, which would be coupled to or from part of the gearing 54, might be mounted on a shaft, one end of which shaft is adapted to engage and be driven from the gear box and the other end of which is adapted to drive the speedometer cable.

It would also be possible to use a control unit similar to the one which will be described with reference to FIGURE 6, but arranging for it to drive a speedometer cable instead of a tacho-generator.

Other forms of drive to the control unit, apart from purely mechanical drives, are also possible. Thus the control unit could be arranged to be driven electrically under the control of a tacho-generator which is coupled to the gear box take-off point. This generator could, in fact, be the same one which is used for the speedometer of the vehicle.

A further development of this would be the use of an electrical impulse unit which is atached to the gear box and which is used to operate or control a transistorized speedometer.

According to yet another arrangement the control unit could be fitted between the gear box and a tacho-generator or electrical impulse unit which is used for the speedometer, in which case the drive to the control unit itself would still be mechanical. A control unit of this kind is shown in FIGURE 6.

This control unit 101 comprises a body, indicated generally at 102, which may be made of metal or of a suitable synthetic plastics material. It carries a drive shaft 103 which is mounted in suitable bearings (not shown). One end of the shaft 103 is connected with and drives a tacho-generator, indicated at 104, which is mounted on the control unit 101. The shaft 102 has a coupling 105 at its other end, which coupling is adapted to engage a drive member which projects from the vehicle gear box and which enters into the casing 102 through an opening in the end 106 of the latter.

Figure 6:
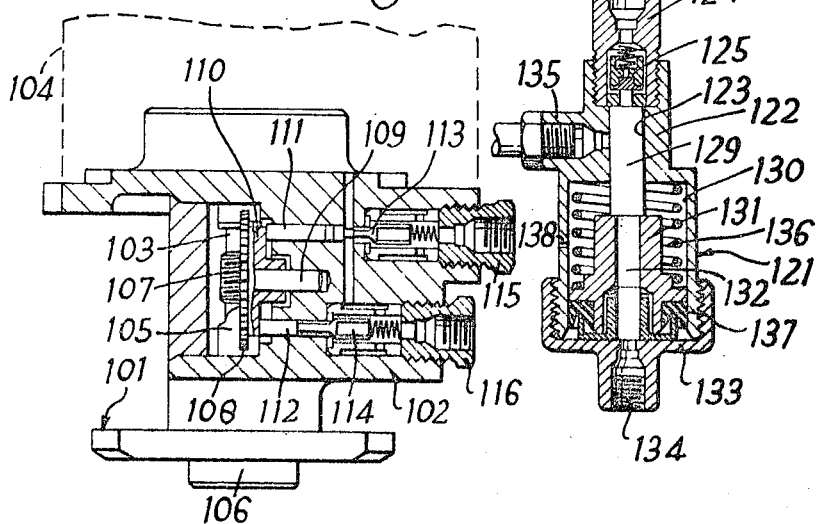
FIGURE 6 is a sectional view showing another form of control unit which may be used.

It will thus be seen that the control unit shown in FIGURE 6 is arranged to be mounted directly between the gear box of the vehicle and the tacho-generator 104, instead of mounting the tacho-generator directly on the gear box.

The shaft 103 carries a worm 107 which drives a gear 108 mounted on a shaft 109. This shaft also carries a spindle cam 110. This cam 110 corresponds to the cam 53 of FIGURE 3 and it operates tappets 111 and 112 and valves 113 and 114. These valves and tappets, together with the associated parts of the control unit 101 correspond exactly to those which have been described with reference to FIGURE 3 and they will not be described here in further detail.

The control unit 101 has inlet and exhaust couplings 115 and 116 which correspond to the couplings 65 and 66 of FIGURE 3. These are connected to the lubricator 1 and safety valve 8 in the same way as is shown in FIGURE 1.

The operation of the control unit 101 will be clear without further description.

Although the invention has been described as applied to lubrication systems which make use of multiple pump lubricators, it is not limited to such systems. It is also applicable to systems in which a single oil pump is used for supplying lubricant to any desired number of lubrication points. In this case a lubricator pump can be and preferably is used which is operated directly by the air pulses from the air control unit.

Figure 7:
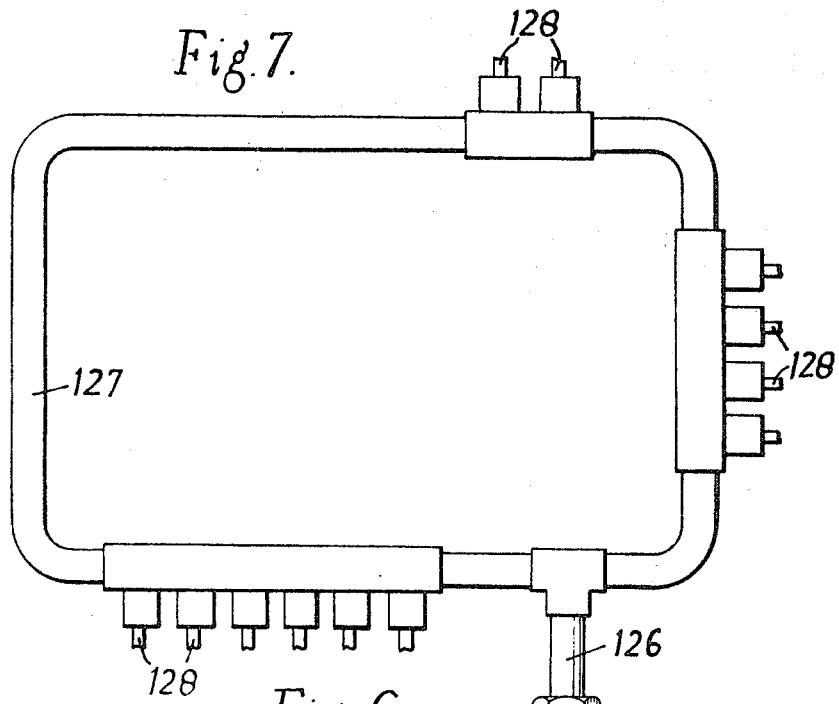
FIGURE 7 is a general view, partly in section, showing another form of lubricator which may be used, in conjunction with a ring main for supplying lubricant to the points to be lubricated.

One such lubricator pump 121 is shown in FIGURE 7. It comprises a body 122 which is formed with a bore 123 extending longitudinally through it. This bore 123 is enlarged at one end to receive an outlet plug 124 within which a non-return delivery valve 125 is fitted, this outlet being connected by suitable pipes 126 and 127 to the points, indicated at 128, to be lubricated. The system preferably includes mastering devices (not shown), which may be of any suitable type, for metering the oil which is supplied to the different points.

The main part of the aforesaid bore 123 includes sections which form cylinders of two different diameters, in which a double piston 129 operates. The inner section of this bore, nearer the outlet valve 125, is of a relatively small diameter and forms the cylinder of an oil pump, whilst the other section 130 of the bore, remote from the outlet, is of substantially greater diameter and contains an air-operated piston head 131. This head is mounted on a rod 132 which forms part of the piston 129.

The open end of the pump cylinder is closed by means of a cap 133 which is provided with an air inlet 134 to which air from the air control unit, which may be the unit of FIGURE 1 or the unit 101 of FIGURE 6, is supplied.

An inlet 135 for oil supplied from the oil reservoir or tank is provided in one side of the body 122 of the pump 121 and opens into the small diameter cylinder 123 at a suitable distance from the non-return valve 125. Reciprocation of the piston 129 thus draws in oil from the reservoir and discharges it through the outlet 124.

A compression spring 136, which acts as a return spring for the piston, is fitted in the air cylinder behind the piston head 131, which latter is provided with a suitable air seal or seals, such as are indicated at 137.

An oil control port 138 is formed in the wall of the air cylinder above the piston head 131 to limit the amount of oil which can accumulate above the piston head in the air cylinder. This oil, which has leaked past the oil delivery part of the piston, lubricating the latter, serves both to lubricate the piston head and to prevent leakage of air past it.

The exhaust valve 125 referred to above can be of any suitable type.

The oil pump 121 which has been described is connected to the point or points to be lubricated, which may be done through a ring main, as shown in FIGURE 7, or in any other suitable way, preferably with the inclusion of the metering devices referred to above to ensure that metered quantities of oil are delivered to the individual points.

In use, each pulse of air from the air control unit causes the piston of the oil pump 121 to make one stroke, thus delivering a shot of oil to each point to be lubricated.

Although it is preferred to use pulses of air under pressure to operate the lubricator unit it would also be possible to use reductions in pressure, the operating parts of the lubricators being modified as necessary. These reductions in pressure might be obtained, for example, from a vacuum-assisted braking system.

We claim:

1. Lubricating apparatus for a vehicle having a tachometer drive, for supplying lubricant to a number of points on the vehicle in dependence on the distance traveled by the vehicle, said apparatus comprising:

a lubricant pump means for supplying lubricant to selected points on a vehicle operable by pulses of differential fluid pressure;

a control unit for supplying differential fluid pressure pulses to said pump means adapted to be mounted on said vehicle including air valve means;

means for operatively connecting the control unit to the tachometer drive of the vehicle;

a fluid source having a pressure differential with ambient;

mean for connecting said control unit to said fluid source; and means connecting said control unit with said lubricant pump so as to transmit differential fluid pressure pulses to said pump.

2. Apparatus as claimed in claim 1, wherein the control unit includes two mechanical drive connections which are adapted to receive ends of flexible cables which form parts of the tachometer drive, such that the drive from one of these cables to the other is transmitted through the unit.

3. Apparatus as claimed in claim 1, wherein the control unit is designed to be connected to a source of compressed air on the vehicle as the operating fluid so as to transmit pulses of air under pressure to the pump and wherein a safety valve is provided which is adjustable to prevent such air pulses from operating the pump means if their pressure is less than a predetermined value.

4. Apparatus as claimed in claim 3, wherein the safety valve includes a diaphragm, a valve member connected with the diaphragm and a spring biasing the valve member into engagement with a valve seat to close the valve except when the pressure of air acting on the diaphragm exceeds a predetermined value.

5. Apparatus as claimed in claim 1, wherein said pump means includes a plurality of oil pumps and at least one cam positioned upon rotation to operate the pumps to deliver lubricant to the points to be lubricated, and drive means for turning the cam at a rate which is proportional to the frequency of the fluid pulses.

6. Apparatus as claimed in claim 5, wherein the drive means include a piston operating in a cylinder and a ratchet drive between the piston and the cam.

7. Apparatus as claimed in claim 1, wherein the pump means is a reciprocating pump which is operated by changes in fluid pressure produced by the action of the control unit.

8. Apparatus as claimed in claim 7, wherein the pump includes a piston having two parts on of which is operated by changes in air pressure produced by the control unit and the other of which pumps lubricant to the points to be lubricated.

9. Apparatus as claimed in claim 1, wherein the control unit includes a drive input which is adapted to be connected to a drive point in the transmission of the vehicle, so as to be included in the tachometer drive, and means connecting the drive point with the air valve means to operate the latter.

10. Apparatus as claimed in claim 9, wherein the connecting means include reduction gearing and a cam driven through the gearing and arranged to operate the valve or valves.

References Cited

UNITED STATES PATENTS

| | | |
|---|---|---|
| 2,823,768 | 2/1958 | Taylor. |
| 2,882,705 | 4/1959 | Shortland. |
| 2,951,556 | 9/1960 | Jackson et al. |
| 3,022,863 | 2/1962 | Sensui et al. |

HOUSTON S. BELL, Jr., Primary Examiner

U.S. Cl. X.R.

123—196